United States Patent [19]

Okuno et al.

[11] Patent Number: 5,474,862
[45] Date of Patent: * Dec. 12, 1995

[54] NONAQUEOUS ELECTROLYTE SECONDARY BATTERIES

[75] Inventors: Hiromi Okuno, Osaka; Hizuru Koshina, Neyagawa; Takayuki Kawahara, Abiko; Katsuaki Hasegawa, Yokkaichi, all of Japan

[73] Assignees: Matsushita Electric Industrial Co., Ltd., Osaka; Mitsubishi Petrochemical Company Limited, Tokyo, both of Japan

[ * ] Notice: The portion of the term of this patent subsequent to Oct. 26, 2010, has been disclaimed.

[21] Appl. No.: 143,191

[22] Filed: Oct. 29, 1993

Related U.S. Application Data

[60] Continuation-in-part of Ser. No. 41,047, Mar. 31, 1993, abandoned, which is a division of Ser. No. 872,980, Apr. 24, 1992, Pat. No. 5,256,504.

[30] Foreign Application Priority Data

Sep. 13, 1991 [JP] Japan .................................. 3-234377
Sep. 13, 1991 [JP] Japan .................................. 3-234378

[51] Int. Cl.⁶ .............................. H01M 6/16; H01M 4/58
[52] U.S. Cl. ........................... 429/197; 429/199; 429/218
[58] Field of Search .................................. 429/197, 194, 429/199, 218

[56] References Cited

U.S. PATENT DOCUMENTS

| | | |
|---|---|---|
| 4,056,663 | 11/1977 | Schlaikjer . |
| 4,804,596 | 2/1989 | Ebner et al. . |
| 4,957,833 | 9/1990 | Daifuku et al. .......................... 429/197 |
| 5,244,757 | 9/1993 | Takami et al. ........................... 429/194 |
| 5,256,504 | 10/1993 | Okuno et al. ............................ 429/197 |

FOREIGN PATENT DOCUMENTS

| | | |
|---|---|---|
| 0391281 | 10/1990 | European Pat. Off. . |
| 57-170463 | 10/1982 | Japan . |
| 61-64082 | 4/1986 | Japan .............................. H01M 6/16 |
| 355770 | 3/1991 | Japan . |
| 3295178 | 12/1991 | Japan . |

*Primary Examiner*—John S. Maples
*Attorney, Agent, or Firm*—Stevens, Davis, Miller & Mosher

[57] ABSTRACT

A nonaqueous electrolyte secondary battery having excellent cycle life characteristic, stability in storage at high temperatures and low-temperature characteristic, which is provided with an anode including a carbon material capable of doping and undoping lithium ion, a nonaqueous electrolyte and a cathode including a lithium-containing oxide, the solvent for the nonaqueous electrolyte being a mixed solvent including an aliphatic carboxylate, a cyclic carbonate and a chain carbonate, with the aliphatic carboxylate being represented by the formula RCOOR' where R represents an ethyl group and R' represents an alkyl group of 1–3 carbon atoms and the cyclic carbonate being one of ethylene carbonate and propylene carbonate.

19 Claims, 10 Drawing Sheets

NUMBER OF CHARGE-DISCHARGE CYCLES

DISCHARGE CAPACITY (mAh)

NONAQUEOUS ELECTROLYTE SECONDARY BATTERIES

This application is a Continuation-in-Part of U.S. Ser. No. 08/041,047, filed Mar. 31, 1993, now abandoned, which is a Divisional of U.S. Ser. No. 07/872,980 filed Apr. 24, 1992, now U.S. Pat. No. 5,256,504, issued Oct. 26, 1993. The disclosures of these two applications are incorporated herein by reference.

BACKGROUND OF THE INVENTION

1. Field of the Invention

The present invention relates to nonaqueous electrolyte secondary batteries and in particular to improvements of the cycle life, high-temperature storage stability and low-temperature discharge capacity characteristics of the batteries.

2. Description of Related Art

With recent rapid progress in the development of portable or cordless electronic equipments, there have been desired small and light-weight secondary batteries having a high energy density for use as electric sources for the driving of these electronic equipments. In this respect, nonaqueous electrolyte secondary batteries, especially lithium secondary batteries, are expected to have a high voltage and high energy density.

When the nonaqueous electrolyte secondary batteries are fabricated, the use of active materials for cathodes of high capacity and high voltage is required. As materials which meet these requirements, mention may be made of those which show a high voltage of 4 V, such as $LiCoO_2$, $LiNiO_2$, $LiFeO_2$ and $LiMn_2O_4$.

On the other hand, metallic lithium, lithium alloys and carbon materials capable of doping and undoping lithium ions are studied as anode materials. However, metallic lithium has a problem of short circuiting caused by dendrites produced by charging and discharging, and lithium alloys have a problem of collapse of electrodes due to expansion and contraction caused by charging and discharging. Accordingly, recently, carbon materials which have no such problems have been considered as anode materials of lithium secondary batteries.

It has been well known that when metallic lithium is used as anode materials, active dendrites produced on the surface of the anode in charging react with a nonaqueous solvent to bring about the decomposition of a part of the solvent, resulting in the reduction of charging efficiency. For solving this problem, Japanese Patent KOKAI (Laid-Open) No. Sho 57-170463 has proposed to use a mixed solvent comprising ethylene carbonate and propylene carbonate in view of the excellent charging efficiency of ethylene carbonate. Japanese Patent KOKAI (Laid-Open) No. Hei 3-55770 has proposed to use a mixture of a mixed solvent comprising ethylene carbonate and diethyl carbonate with 2-methyltetrahydrofuran, 1,2-dimethoxyethane, 4-methyl-1,3-dioxorane or the like as a solvent for the nonaqueous electrolyte in order to improve the low-temperature characteristics of batteries. Furthermore, U.S. Pat. No. 4,804,596 has proposed to use, as solvents for the nonaqueous electrolyte, those which contain esters such as methyl acetate and methyl formate as a base which are high in oxidation resistance and provide a high electric conductivity in order to improve high-rate discharge characteristics and low-temperature characteristics of the batteries.

However, even when these solvents are used, a charging efficiency obtainable is at most about 98–99%, and a charging efficiency has not yet been sufficiently enhanced. This is the same when a lithium alloy is used for the anode.

When a carbon material is used for anode materials, the charging reaction is such that the lithium ions in the electrolyte are intercalated between layers of the carbon material and so dendrites of lithium are not produced and thus the decomposition reaction of solvent on the surface of the anode as referred to above should not take place. However, actually, the solvent decomposes and charging efficiency does not reach 100% and there still remain the same problems as when lithium or a lithium alloy is used for anode.

Generally, a requirement for an excellent solvent of electrolyte for lithium batteries is that the solvent have a high dielectric constant, namely, it can dissolve a large amount of an inorganic salt which is a solute. Cyclic esters such as propylene carbonate, ethylene carbonate, γ-butyrolactone and γ-valerolactone are said to be excellent solvents which satisfy the above requirement, but still have the above problem that when carbon materials are used for anode materials, the decomposition reaction of solvent takes place in charging as mentioned above. Moreover, since the solvents above are highly viscous, there are problems that when they are used alone, the viscosity of the electrolytes is high and there is a difficulty in charging and discharging at a high rate and besides, a discharge capacity at low temperatures is low. Especially, ethylene carbonate has a high freezing point of 36.4° C. and this cannot be used alone.

On the other hand, the decomposition reaction of chain carbonates in charging does not readily occur because of their structure, but these solvents have the defect that they are relatively low in dielectric constant and dissolve, with difficulty, the inorganic salt which is a solute and have the problem that many of them are relatively low in boiling point and so they are difficult to handle in the fabrication of batteries.

Furthermore, when these cyclic and chain carbonates are used in admixture, the above-mentioned problems in the case of using these compounds each alone are diminished, and excellent charge-discharge cycle life characteristics can be obtained but high-rate charge and discharge characteristics and low-temperature charge and discharge characteristics are insufficient. Usually, ethers of low freezing point and low viscosity are added to solvents used for electrolytes in order to improve the low-temperature characteristics of lithium batteries. However, ethers are generally low in oxidative decomposition voltage and when the above-mentioned lithium-containing oxides having a high voltage such as $LiCo_2O_2$, $LiNiO_2$, $LiFeO_2$ and $LiMn_2O_4$ are used as active materials for cathode, the decomposition reaction of the solvents is brought about in charging of batteries.

SUMMARY OF THE INVENTION

The present invention has solved the above-mentioned problems.

That is, it is a main object of the present invention to provide nonaqueous electrolyte secondary batteries which have a long life and are excellent in retention of discharge capacity at low temperatures and besides, are stable in storage at high temperatures.

It is another object of the present invention to provide a solvent composition for nonaqueous electrolytes which is preferred for nonaqueous electrolyte secondary batteries.

DETAILED DESCRIPTION OF PREFERRED EMBODIMENTS

Figure 1:
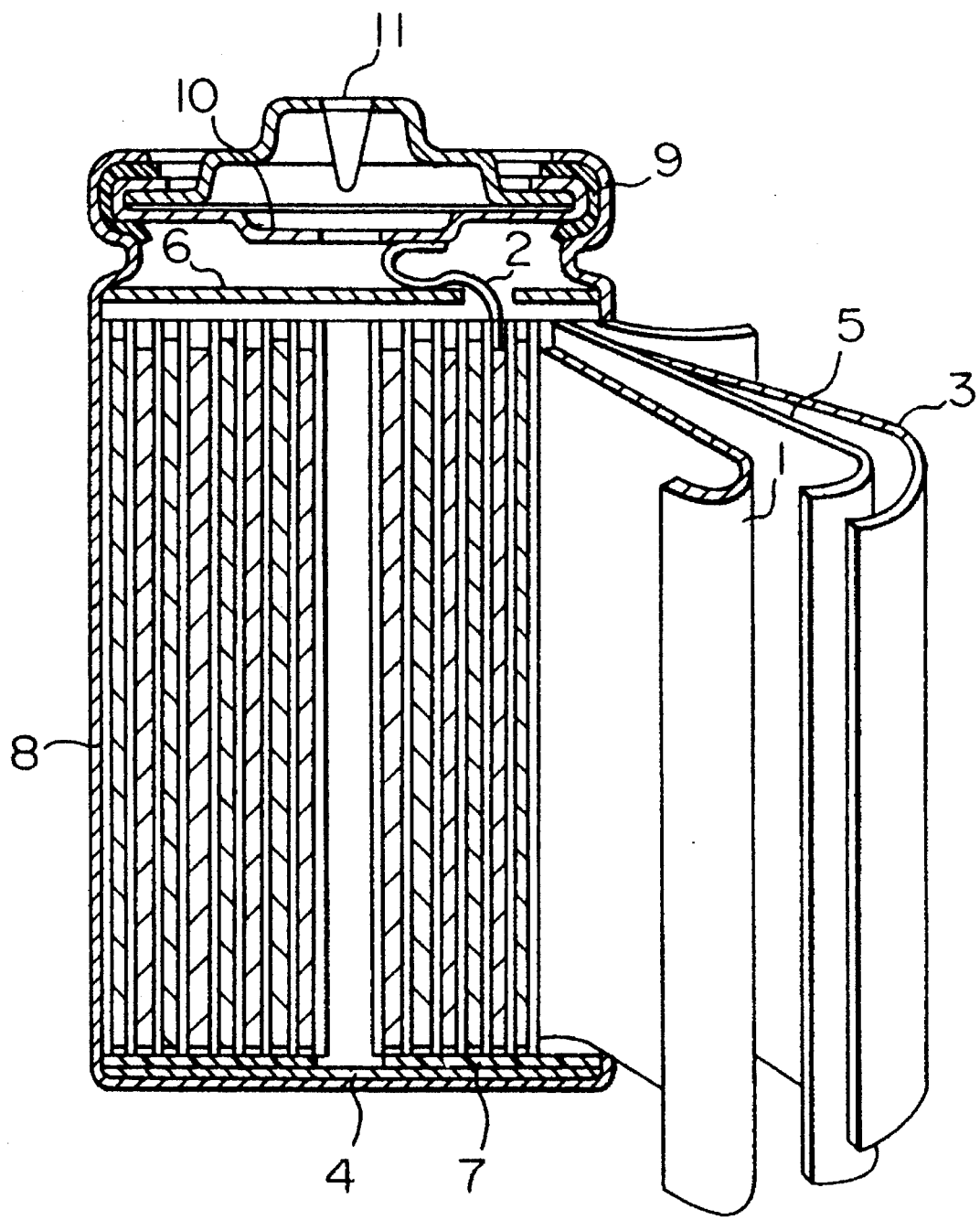
FIG. 1 is a longitudinal cross-sectional view of the cylindrical battery used in examples of the present invention.

As a result of intensive research conducted by the inventors in an attempt to solve the above-mentioned problems and to obtain nonaqueous electrolyte secondary batteries sufficiently enhanced in charging efficiency, they have come to consider that this phenomenon does not occur owing to the decomposition reaction of the solvent on the surface of anode as in the case of using metallic lithium for the anode, but occurs owing to the fact that when the lithium is intercalated between layers of carbon material of an anode, not only the lithium, but also the solvent which coordinates with the lithium, are intercalated between the layers to bring about a partial decomposition reaction of the solvent. That is, solvents having a cyclic structure such as cyclic esters and having a large molecular radius are not smoothly intercalated between the layers of the carbon material of the anode, but are decomposed at the entrance of the layers. Thus, the charging efficiency does not reach 100%. On the other hand, it is considered that solvents having a chain structure are relatively difficultly decomposed.

Furthermore, it has been found that among the cyclic esters, lactones such as γ-butyrolactone and γ-valerolactone having only one oxygen in the 5-membered ring are structurally unstable and readily decomposed during charging and discharging of batteries, and that carbonates containing two oxygens, especially ethylene carbonate having a bilaterally symmetric structure are relatively stable.

In order to inhibit the decomposition reaction mentioned above and provide a battery which is excellent in charging and discharging at high rates and discharge capacity at low temperatures, the present invention proposes to use a mixture of a cyclic carbonate, a chain carbonate and an aliphatic carboxylate having a chain structure as solvent components.

It has been proposed in Japanese Patent KOKAI (Laid-Open) No. Hei 3-295178 to use the two components among the above three components excluding the chain carbonate for electrolytes, but according to the investigation by the inventors, the shelf life characteristic at high temperatures is insufficient when only these two components are used. On the other hand, it has been found that when the chain carbonate is added and the three-component mixed solvent is used, the shelf life characteristic at high temperatures can be improved without damaging the superior characteristics in charging and discharging at high temperatures and in discharging at low temperatures obtained when the two-component mixed solvent is used. It is considered that this is owing to the reaction between lithium in the anode and the solvent, namely, owing to the higher reactivity of an aliphatic carboxylate with lithium than a chain carbonate.

Furthermore, it has been found that a preferable nonaqueous electrolyte for the nonaqueous electrolyte secondary batteries is obtained when the proportion of the aliphatic carboxylate is 10–70% by volume, that of the cyclic carbonate is 20–70% by volume, and that of the chain carbonate is 10–70% by volume based on total solvent components. Moreover, it has also been found that there is a specific correlation between the carbon for the anode and the cyclic ester, one of the solvents for the electrolyte. When graphites such as an artificial graphite, natural graphite or highly graphitized carbon such as mesocarbon microbeads having been heat-treated at a high temperature of 2000° C. or higher having a lattice spacing (d002) of 3.40 Å or less, which can be measured by a wide angle X-ray diffraction method of carbon, are used, ethylene carbonate with a relatively small molecular radius is useful. When a carbon having been heat-treated at a temperature of 1500° C. or lower and slightly graphitizable carbon and the like, which are amorphous carbon having a large d002 of 3.40 Å or more (in one embodiment, 3.43 Å or more), are used, propylene carbonate, γ-butyrolactone, butylene carbonate and the like are useful. It has been also found that further superior characteristics are obtained when the highly graphitized carbon having a lattice spacing (d002) of not more than 3.40 Å (e.g., in one embodiment, 3.39 Å or less and in another embodiment, not less than 3.36 Å and not more than 3.38 Å), as measured by a wide angle X-ray diffraction method of carbon, is used for the anode active material, and ethylene carbonate is used as the cyclic carbonate and the proportion of aliphatic carboxylate is 10–40% by volume, that of ethylene carbonate is 20–30% by volume and that of chain carbonate is 30–70% by volume based on the total solvent components and lithium hexafluorophosphate is used as a solute.

Furthermore, it has been found that especially superior characteristics are obtained when aliphatic carboxylate, ethylene carbonate and chain carbonate are mixed at a volume ratio of 2:3:5 or 1:3:6, in which the respective values include errors within ±30%. It has also been found that further superior characteristics are obtained when amorphous carbon having a lattice spacing (d002) of 3.40 Å or more, is used for the anode active material, and propylene carbonate is used as the cyclic carbonate and the proportion of aliphatic carboxylate is 10–40% by volume, that of propylene carbonate is 30–50% by volume, and that of chain carbonate is 30–70% by volume based on the total volume of the solvent components and lithium hexafluorophosphate is used as a solute.

Furthermore, it has been found that especially superior characteristics are obtained when aliphatic carboxylate, ethylene carbonate and chain carbonate are mixed at a volume ratio of 2:5:3 or 3:5:2, in which the respective values include errors within ±30%. Thus, the present invention has been accomplished.

Explanation will be made in detail by the examples given hereinafter.

In a solvent for electrolyte, the cyclic carbonate has an effect to increase the electric conductivity of the electrolyte by dissolving a large amount of an inorganic salt as a solute, and the chain carbonate can inhibit the decomposition of the solvent because it coordinates with lithium in the charging of batteries and can easily enter between layers of a carbon material. By further adding thereto a suitable amount of the aliphatic carboxylate having a high decomposition voltage, a low freezing point and a low viscosity, the freezing point and viscosity of the electrolyte can be lowered and, as a result, the batteries exhibit excellent low-temperature characteristics.

Among the aliphatic carboxylates represented by the formula of RCOOR', those in which R is hydrogen or a methyl group such as methyl formate and methyl acetate have a high reactivity with lithium, and this problem is not solved even when the carbon materials are used for the anode, and the battery characteristics are greatly deteriorated especially when the batteries are used at high temperatures where the chemical reaction rate is high, or stored at high temperatures. The inventors have found that this reaction depends greatly upon R in the formula of RCOOR', and when R contains 2 carbon atoms, namely, when R is an ethyl group, the reactivity with lithium is much lowered and besides, excellent characteristics can be exhibited. Further, R' participates in the structural stability and viscosity of the solvent, and with increase in the carbon number of R' the solvent tends to become structurally unstable and increase in viscosity. Therefore, it has been found that the carbon number in R' is preferably 1–3.

According to the present invention, the nonaqueous electrolyte secondary batteries having excellent cycle life characteristics, high-rate charge and discharge characteristics, low-temperature characteristics and stability at high temperatures are provided by using as a solvent for electrolyte a mixed solvent comprising a cyclic carbonate, for example, propylene carbonate or ethylene carbonate and a chain carbonate, for example, diethyl carbonate or dimethyl carbonate or ethyl methyl carbonate to which a suitable amount of an aliphatic carboxylate having 2 carbon atoms in R, namely, methyl propionate, ethyl propionate or propyl propionate is added.

In order to find the cyclic esters which are stable in charging and discharging, some cylindrical batteries were made using three kinds of solvents for electrolytes, namely, propylene carbonate alone, a mixture of propylene carbonate and ethylene carbonate, and γ-butyrolactone alone. The cycle lives of these batteries were examined prior to making the batteries of the present invention as examples. As the carbonate for the anode active material, two kinds of carbon are used: mesocarbon microbeads having been heat-treated at 2800° C. and petroleum coke having been heat-treated at 1300° C. As a result, in the case of using petroleum coke for the anode, there were found almost no differences between one and another of the three kinds of electrolyte. When the microbeads of mesocarbon are used as the anode active material, using a mixed solvent of propylene carbonate and ethylene carbonate gave the longest life. Using propylene carbonate alone gave a shorter life, that is, at the initial charging time, a gas produced by decomposition of the solvent raised the inner pressure of the battery so that leakage occurred, and the γ-butyrolactone was degraded with cycles.

To summarize from the foregoing, ethylene carbonate is suitable as the cyclic carbonate when the highly graphitized carbon is used as the anode active material, and all the ethylene carbonate, propylene carbonate and γ-butyrolactone are usable when the amorphous carbon is used. In the above test, ethylene carbonate was used in admixture with propylene carbonate because ethylene carbonate has a high melting point and solidifies at room temperature.

FIG. 1 is a longitudinal cross-sectional view of the cylindrical battery. In FIG. 1, 1 indicates a cathode. This cathode is produced by coating on both the sides of an aluminum foil a mixture comprising $LiCoO_2$ as an active material, carbon black as a conducting material and an aqueous dispersion of polytetrafluoroethylene as a binder at a weight ratio of 100:3:10, drying and rolling the coated foil, and then cutting it to a given size. To this cathode is spot welded titanium lead plate 2. The mixing ratio of the aqueous dispersion of polytetrafluoroethylene as binder is calculated in terms of the solid content. Anode 3 is produced by coating on both the sides of a nickel foil a mixture comprising a carbonaceous material as a main component and an acrylic binder at a weight ratio of 100:5, drying and rolling the coated foil, and then cutting it to a given size. To this anode is also spot welded nickel lead plate 4 for the anode. Polypropylene microporous film separator 5 is provided between cathode 1 and anode 3, and these are rolled in the form of a spiral to constitute a plate group. Polypropylene insulating sheets 6, 7 are provided at the upper and lower ends of the plate group, respectively, and this is packed in case 8 made of nickel-plated iron. Cathode lead 2 is spot welded to titanium sealing plate 10 and anode lead 4 is spot welded to the bottom of case 8. Then, a given amount of an electrolyte is poured thereinto and the battery is sealed by sealing plate 10 through gasket 9 to complete a battery. This battery has a size of 14 mm in diameter and 50 mm in height. The numeral 11 indicates a cathode terminal and case 8 serves as an anode terminal.

The cylindrical batteries used in the following examples has the same construction as mentioned above.

EXAMPLE 1

The same cylindrical batteries as mentioned above were made by way of experiment using a mixture of ethylene carbonate (hereinafter referred to as "EC") exhibiting the best characteristics among the cyclic esters used in the above-mentioned test and investigation with the following solvent at a volume ratio of 30:70 for two-component mixed solvents and 30:35:35 for three-component mixed solvents. That is, methyl acetate (hereinafter referred to as "MA") as an aliphatic carboxylate was used in admixture with EC in battery A, methyl propionate (hereinafter referred to as "MP") as an aliphatic carboxylate was used in admixture with EC in battery B, diethyl carbonate (hereinafter referred to as "DEC") as a chain carbonate was used in admixture with EC in battery C, and MP and DEC were used in admixture with EC in battery D. As a solute for the electrolyte, lithium hexafluorophosphate was used in all of the batteries with an adjusted concentration to 1 mol/l. As the carbon for the anode active material, mesocarbon microbeads having been heat-treated at 2800° C. were used.

The electric capacity of batteries A–D depend on the discharge capacity of $LiCoO_2$ used as an active material of the cathode and the discharge capacity of each of the batteries is determined as 500 mAh assuming that the electron number of the reaction of $LiCoO_2$ is 0.45.

The evaluated battery characteristic was a charge-discharge cycle life characteristic at 20° C. The test conditions were a charging and discharging current: 100 mA, final charge voltage: 4.1 V, and final discharge voltage: 3.0 V, and the charging and discharging were repeated and the test was terminated when the discharge capacity deteriorated to less than 250 mAh which was ½ of the initial capacity. Comparison was made on the number of cycles at that time. The results are shown in FIG. 2.

Figure 2:
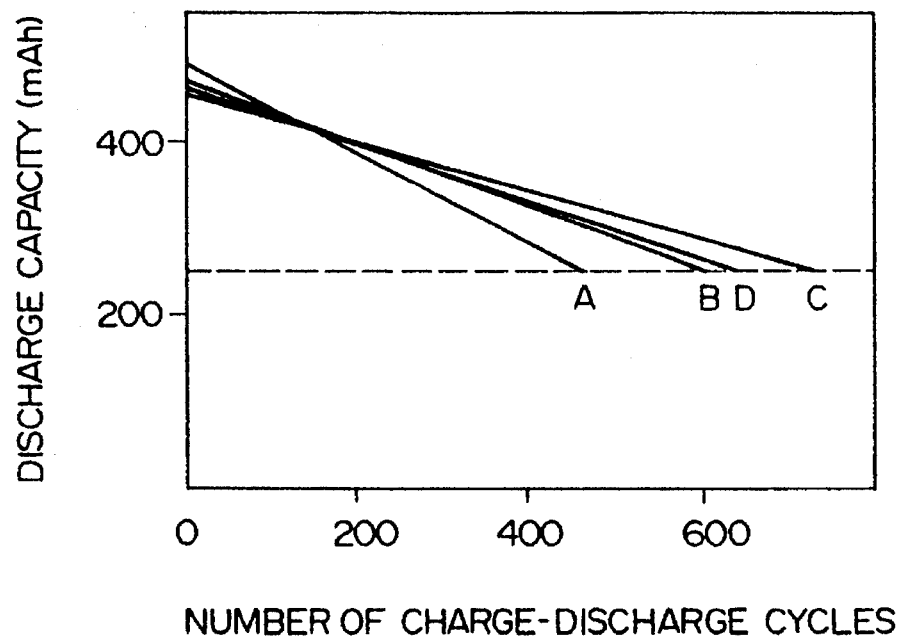
FIG. 2 is a graph which shows a change of the discharge capacity with the number of charge-discharge cycles at 20° C. in the batteries of Example 1.

As can be seen from FIG. 2, these batteries A–D have better cycle life characteristics in the order of C-D-B-A with C being the best. That is, in the two-component solvents, among the solvents used in admixture with EC, DEC as a chain carbonate gave the best characteristic, MP as an aliphatic ester gave a characteristic next to that given by DEC, and MA as an aliphatic ester gave a characteristic next to that given by MP. From the results, it can be considered that with an increase of the carbon number contained in R of the aliphatic carboxylate represented by RCOOR', the reactivity of the solvent with lithium decreases and the decomposition of the solvent brought about with progress of charge-discharge cycle does not occur, resulting in superior cycle life characteristics. Since the chain carbonates are more stable against lithium than the aliphatic carboxylates, the cycle life characteristic of battery C was the best.

The ranking of the three-component solvent of EC, MP and DEC of battery D was between the two-component solvent of EC and MP and that of EC and DEC.

EXAMPLE 2

Cylindrical batteries A'-D' were made using the same electrolytes and carbon used for the anode active material as used in Example 1 and subjected to the low-temperature test and shelf life test. First, the low-temperature test and then the shelf life test were conducted. Ten cycles of charge-discharge of these batteries were repeated at 20° C. under the same conditions as in Example 1 and then, the test was stopped in a charged state. Thereafter, the discharge was carried out under the same conditions except for a temperature changed to −10° C. and the low-temperature discharge characteristic was evaluated by the discharge capacity obtained. Then, the temperature was returned to 20° C. and ten cycles of charge-discharge were carried out under the same conditions. The test was stopped in a charged state and the batteries were left to stand for 1 month at 60° C. Thereafter, the discharge was carried out under the same conditions, and the shelf life characteristic was evaluated by the capacity at that time.

Figure 3:
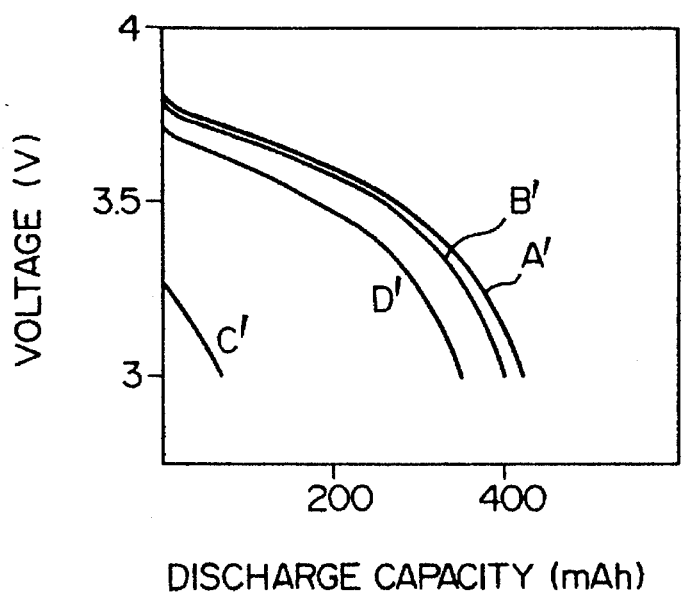
FIG. 3 is a graph which shows a change of the discharge voltage at −10° C. of the batteries in Example 2.
Figure 4:
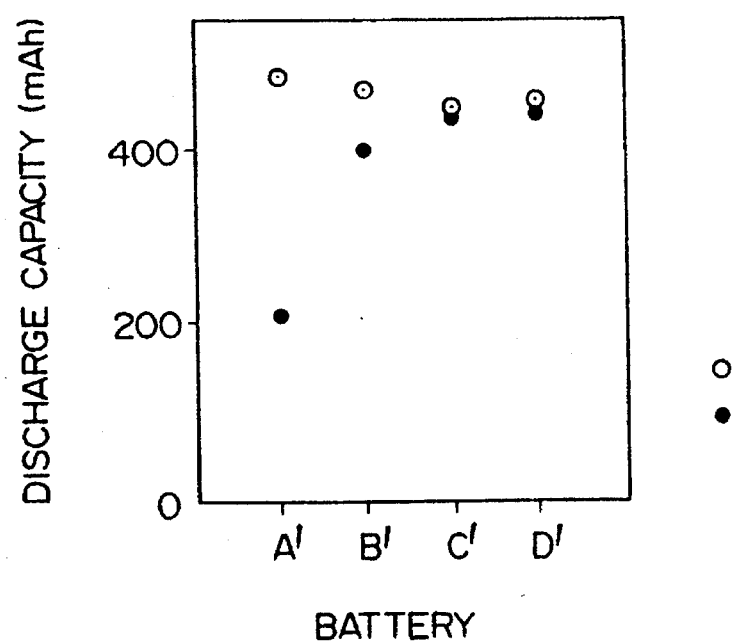
FIG. 4 is a graph which shows the discharge capacity of the batteries before and after stored in Example 2.

The low-temperature discharge characteristics of batteries A'–D' are shown in FIG. 3 and the shelf life characteristics are shown in FIG. 4.

As shown in FIG. 3, the low-temperature characteristics of these batteries A'–D' were lowered in the order of A'-B'-D'-C' with A' being the best. In the case of the two-component solvents, with decrease of the carbon number contained in R of the aliphatic carboxylate of RCOOR' mixed with EC, the low-temperature characteristic was superior. This is because the solvent less in carbon number is lower in viscosity and increases electric conductivity at low temperatures. Furthermore, for the aliphatic carboxylate and the chain carbonate, the former gave superior low-temperature characteristic. This is also because the aliphatic carboxylate increases electric conductivity at lower temperatures than the chain carbonate. The ranking of the three-component solvent comprising EC, MP and DEC in battery D' was between the two-component solvent comprising EC and MP and the two-component solvent comprising EC and DEC and was closer to the two-component solvent comprising EC and MP in discharge capacity at low temperatures. The low-temperature characteristic was improved by the addition of MP, but the effect did not increase so much when the amount of MP added was more than a certain level.

Next, as shown in FIG. 4, the shelf lives of batteries A'–D' were lowered in the order of C'-D'-B'-A' with C' being the best. Battery A' was especially inferior, and the capacity thereof after being stored at high temperatures decreased to less than 50% of the capacity before being stored. On the other hand, batteries B', C' and D' maintained capacities of more than 85% even after being stored. From these results it can be seen that superior shelf life characteristic at high temperatures can be obtained when a mixture of EC with methyl propionate which is an aliphatic carboxylate of RCOOR' where the carbon number of R is 2 is used as a solvent for electrolyte. Battery C' where the chain carbonate was used was further higher in capacity after being stored as compared with the battery where the aliphatic carboxylate was used and thus, good shelf life characteristic at high temperatures was obtained. The ranking of the three-component solvent comprising EC, MP and DEC in battery D' was between the two-component solvent comprising EC and MP and the two-component solvent comprising EC and DEC and was closer to the two-component solvent comprising EC and DEC in retention of capacity after being stored. The characteristic was not improved simply because the amount of MP was reduced, but the addition of DEC inhibited the reaction between MP and lithium in the carbon of the anode.

From the results of Examples 1 and 2, good results were obtained in all of the cycle life characteristic, low-temperature discharge characteristic and high-temperature shelf life characteristic when a mixed solvent comprising EC, an aliphatic carboxylate and chain carbonate where the carbon number of R in the aliphatic carboxylate is 2 was used as solvent for an electrolyte.

EXAMPLE 3

The same cylindrical batteries as mentioned above were made using the solvents comprising EC, DEC and MP which showed good characteristics in Examples 1 and 2 and which were mixed at the following six volume ratios. Lithium hexafluorophosphate was used as a solute of electrolyte as in Examples 1 and 2 with a concentration adjusted to 1 mol/l.

Battery E . . . EC:MP:DEC=1:4.5:4.5
Battery F . . . EC:MP:DEC=2:4.0:4.0
Battery G . . . EC:MP:DEC=3:3.5:3.5
Battery H . . . EC:MP:DEC=4:3.0:3.0
Battery I . . . EC:MP:DEC=5:2.5:2.5
Battery J . . . EC:MP:DEC=6:2.0:2.0

The constituting conditions other than the electrolytes mentioned above were the same as in Examples 1 and 2.

The evaluated battery characteristic were a cycle life characteristic and low-temperature characteristic. First, ten cycles of the charge-discharge of the batteries were repeated at 20° C. under the same conditions as in Examples 1 and 2 and then, the test was stopped in a charged state. Thereafter, discharge was carried out under the same conditions except for the temperature changed to −10° C., and the low-temperature characteristic was evaluated by the discharge capacity obtained. Then, the temperature was returned to 20° C., and the charging and discharging were repeated under the same conditions. The test was terminated when the discharge capacity deteriorated to less than 250 mAh and the number of cycles at that time was compared.

Figure 5:
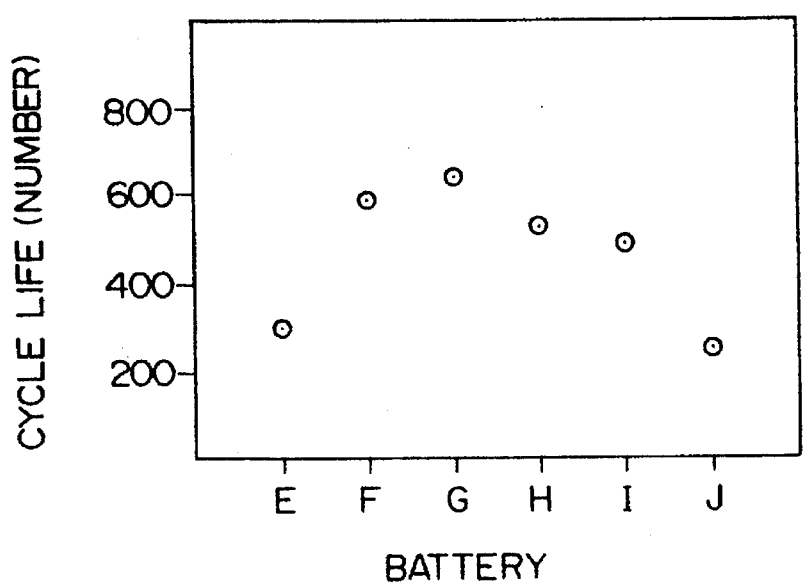
FIG. 5 is a graph which shows the cycle life at 20° C. of the batteries in Example 3.
Figure 6:
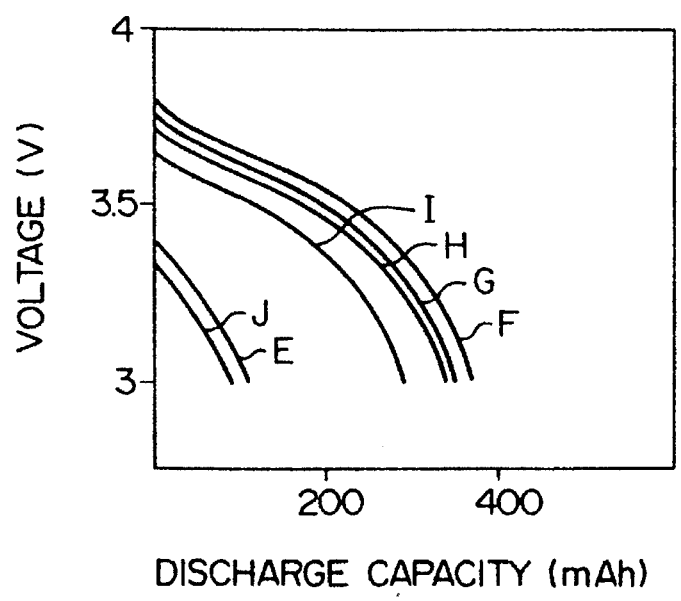
FIG. 6 is a graph which shows a change of the discharge voltage at −10° C. of the batteries in Example 3.

The cycle life characteristic and the low-temperature discharge characteristic of batteries E–J are shown in FIG. 5 and FIG. 6, respectively.

As shown in FIG. 5, the cycle lives of batteries E–J were lowered in the order of G-F-H-I-E-J with G being the best. It is considered that the mixing ratio of EC is suitably 20–50% and when it is less than this range, the electric conductivity decreases and so the cycle life is adversely affected and when it is more than this range, the degree of decomposition of EC increases and so the cycle life deteriorates much.

As shown in FIG. 6, the low-temperature characteristics of the batteries E–J were lowered in the order of F-G-H-I-E-J with F being the best, and batteries E and J were especially inferior. The reason for J being inferior is considered that since the mixing ratio of EC was high, the electrolyte increased in viscosity at low temperatures and polarization of the battery increased and, as a result, discharge capacity decreased. On the other hand, it is considered that in battery E, since the mixing ratio of EC having high dielectric constant was low, it has no ability to dissolve a given amount of solute at low temperatures to cause precipitation of the solute and liquid resistance increased to bring about an increase of polarization.

From the above results, it can be seen that the most suitable mixing ratio of EC in the three-component solvent of aliphatic carboxylate, cyclic carbonate and chain carbonate is 20–50% based on the total solvent components.

EXAMPLE 4

The same cylindrical batteries as mentioned above were made using as solvents for electrolytes the following five mixed solvents prepared by combination of the three components of EC, DEC and MP as in Example 3. Lithium hexafluorophosphate was used as a solute of electrolyte as in Examples 1–3 with a concentration adjusted to 1 mol/l.

Battery K . . . EC:MP:DEC=2:0.5:7.5

Battery L . . . EC:MP:DEC=2:1.0:7.0

Battery M . . . EC:MP:DEC=2:4.0:4.0

Battery N . . . EC:MP:DEC=2:7.0:1.0

Battery O . . . EC:MP:DEC=2:7.5:0.5

The constituting conditions and test conditions other than those of the electrolytes mentioned above were the same as in Example 3.

Figure 7:
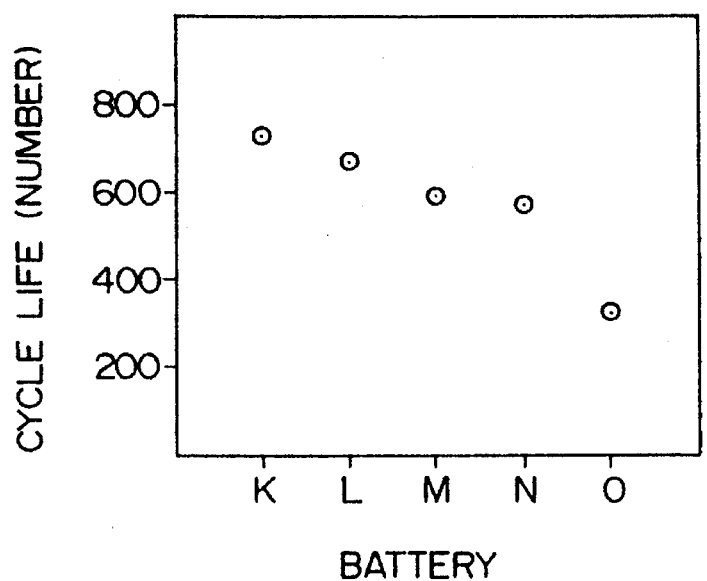
FIG. 7 is a graph which shows the cycle life at 20° C. of the batteries in Example 4.
Figure 8:
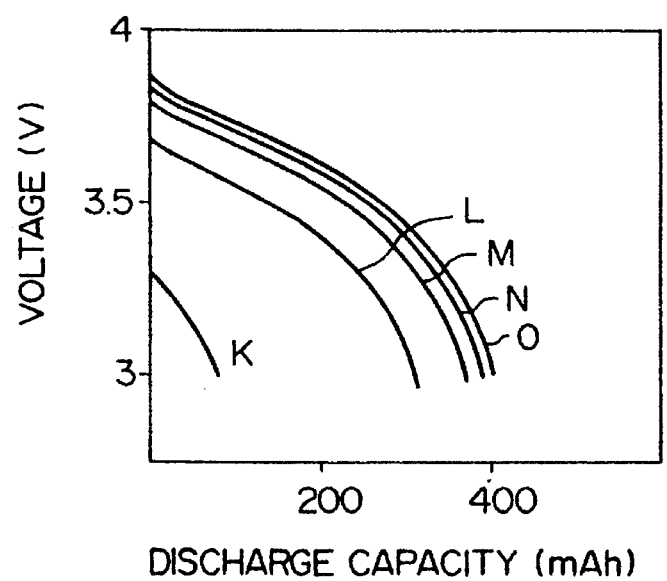
FIG. 8 is a graph which shows a change of the discharge voltage at −10° C. of the batteries in Example 4.

The cycle life characteristic and the low-temperature discharge characteristic of batteries K–O are shown in FIG. 7 and FIG. 8, respectively.

As shown in FIG. 7, the cycle lives of batteries K–O were lowered in the order of K-L-M-N-O with K being the best, and the cycle life was longer with decrease in the mixing ratio of MP and increase in the mixing ratio of DEC. It is considered that this is because DEC is more stable against lithium than MP.

The battery O was especially inferior. The effect to inhibit the deterioration of cycle life by addition of DEC appeared at the addition of 10% or more of DEC, and the effect was insufficient when the added amount was less than 5%.

On the other hand, as shown in FIG. 8, the low-temperature characteristics of the batteries were lowered in the order of O-N-M-L-K with O being the best, and the battery K was especially inferior. It is considered that this is because the mixing ratio of MP which was a low-viscosity solvent was merely 5% and hence, the electric conductivity at low temperatures was low, and the capacity was insufficient. On the other hand, the effect of addition of MP was seen in batteries L–O, and these batteries showed sufficient discharge capacity.

From the above results, it was found that the lower limit of the optimum mixing ratio of MP was 10% and when the mixing ratio was less than 10%, the effect of the addition of MP at low temperatures was not obtained. The lower limit of the mixing ratio of DEC was also 10% and when it was less than 10%, the effect to inhibit the deterioration of cycle life was not obtained. The upper limit calculated from the lower limits of EC and MP was 70%.

EXAMPLE 5

The same cylindrical batteries as mentioned above were made using as a solvent for electrolyte the following five mixed solvents prepared by combination of the three components of EC, DEC and MP as in Example 3 and 4. Lithium hexafluorophosphate was used as a solute of electrolyte as in Examples 1–4 with a concentration adjusted to 1 mol/l.

Battery P . . . EC:MP:DEC=3: 0:7.0

Battery Q . . . EC:MP:DEC=3:1.0:6.0

Battery R . . . EC:MP:DEC=3:2.0:5.0

Battery S . . . EC:MP:DEC=3:3.0:4.0

Battery T . . . EC:MP:DEC=3:5.0:2.0

The constituting conditions and test conditions other than those of the electrolytes mentioned above were the same as in Examples 3 and 4.

Figure 9:
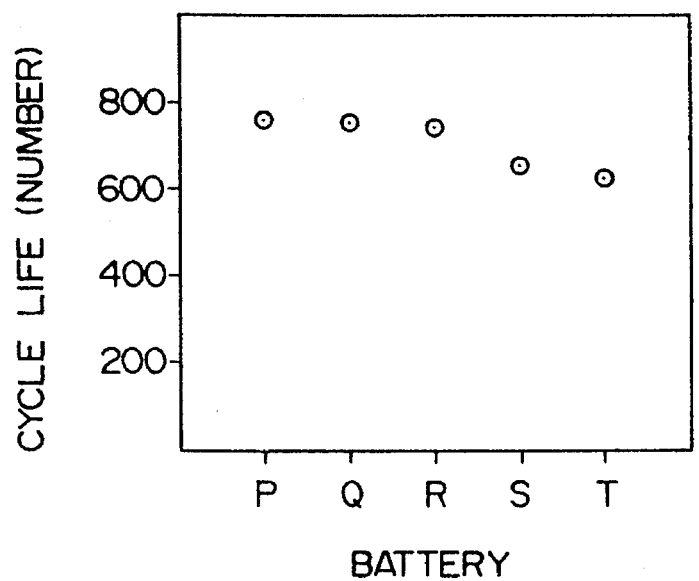
FIG. 9 is a graph which shows the cycle life at 20° C. of the batteries in Example 5.
Figure 10:
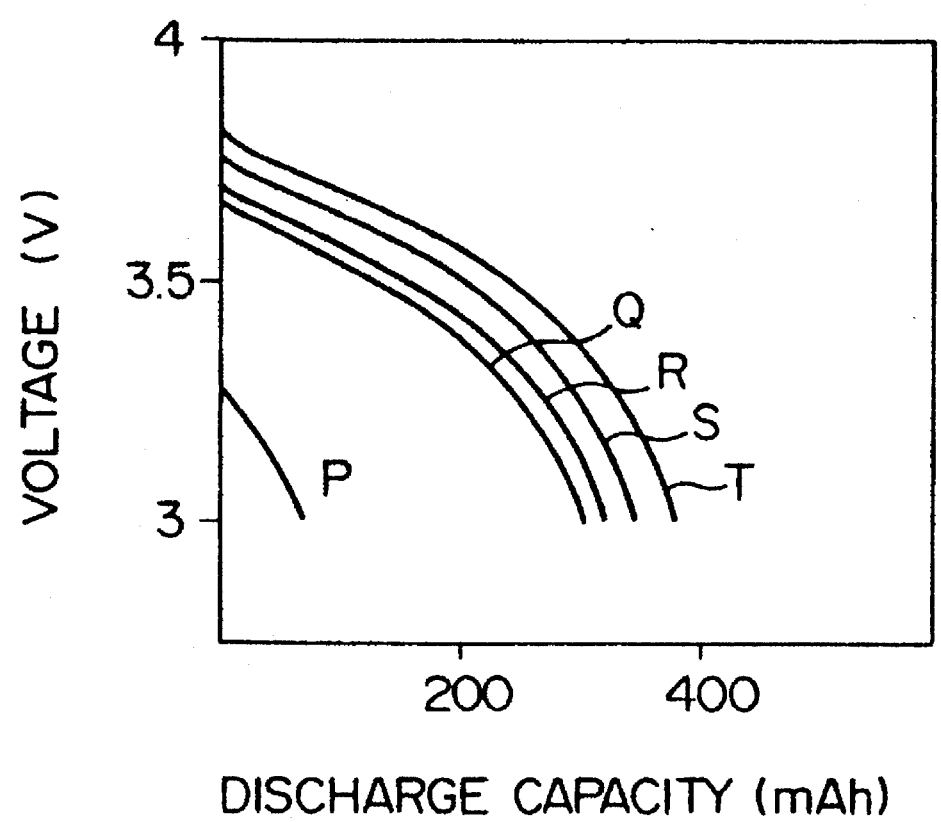
FIG. 10 is a graph which shows a change of the discharge voltage at −10° C. of the batteries in Example 5.

The cycle life characteristic and the low-temperature discharge characteristic of batteries P–T are shown in FIG. 9 and FIG. 10, respectively.

As shown in FIG. 9, the cycle lives of these batteries P–T were lowered in the order of P-Q-R-S-T with P being the best, and the cycle life was longer with decrease in the mixing ratio of MP and increase in the mixing ratio of DEC as in Example 4. In general, the life of the batteries was longer than in Example 4 and considering the results together with those of Example 3, the optimum mixing ratio of EC is considered to be 30%.

Furthermore, the lives of batteries P–R were especially long and the range of the mixing ratio of these batteries is considered to be optimum.

On the other hand, the low-temperature characteristics of the batteries were lowered in the order of T-S-R-Q-P with T being the best and the battery P was especially inferior. It is considered that this is because since aliphatic carboxylate was not contained, and only a cyclic carbonate and chain carbonate were used in admixture, the electric conductivity at low temperatures was low and no sufficient capacity was obtained. On the other hand, the effect of the addition of MP was seen in batteries Q–T and these batteries showed sufficient discharge capacity.

From the above results, it was found that the optimum mixing ratio of EC, MP and DEC excellent in both the cycle life characteristic and the low-temperature characteristic was 3:1:6 or 3:2:5.

EXAMPLE 6

The same cylindrical batteries as mentioned above were made by way of experiment using a mixture of propylene carbonate (hereinafter referred to as "PC") with the following solvent at a volume ratio of 30:70 for two-component mixed solvents and 30:35:35 for three-component mixed solvents. That is, ethyl acetate (hereinafter referred to as "EA") as an aliphatic carbonate was used in admixture with PC in battery a, ethyl propionate (hereinafter referred to as "EP") as an aliphatic carboxylate was used in admixture with PC in battery b, ethyl methyl carbonate (hereinafter referred to as "EMC") as a chain carbonate was used in admixture with PC in battery c, and EP and EMC were used in admixture with PC in battery d. As a solute for the electrolyte, lithium hexafluorophosphate was used in all of the batteries with an adjusted concentration of 1 mol/l and petroleum coke having been heat-treated at 1300° C. was used for the anode active material.

The evaluated battery characteristic was a charge-discharge cycle life characteristic at 20° C. The test conditions were the same as those of Example 1. The results are shown in FIG. 11.

Figure 11:
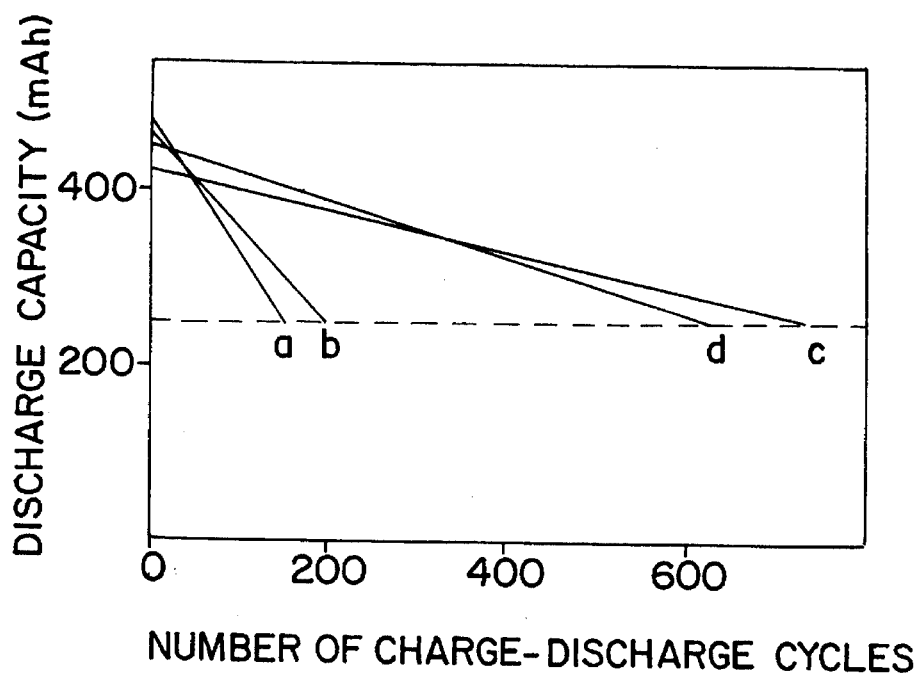
FIG. 11 is a graph which shows a change of the discharge capacity with the number of charge-discharge cycles at 20° C. in the batteries of Example 6.

As can be seen from FIG. 11, these batteries a–d have better cycle life characteristics in the order c-d-b-a with c being the best. That is, in the two-component solvents, among the solvents used in admixture with PC, EMC as a chain carbonate gave the best characteristic, EP as an aliphatic ester gave a characteristic next to that given by EMC, and EA as an aliphatic ester gave a characteristic next to that given by EP. From the results, it can be considered that with increase of the carbon number contained in R of the aliphatic carboxylate represented by RCOOR', the reactivity of the solvent with lithium decreases and the decomposition of the solvent brought about with progress of the charge-discharge cycle does not occur, resulting in superior cycle life characteristics. Since the chain carbonates are more stable against lithium than the aliphatic carboxylates, the cycle life characteristic of battery c was the best.

The ranking of the three-component solvent of PC, EP and EMC of battery d was between the two-component solvent of PC and EP and that of PC and EMC.

EXAMPLE 7

Cylindrical batteries a'–d' were made using the same electrolytes as used in Example 6 and subjected to the low-temperature test and shelf life test. Tests were done by the same method as Example 1.

Figure 12:
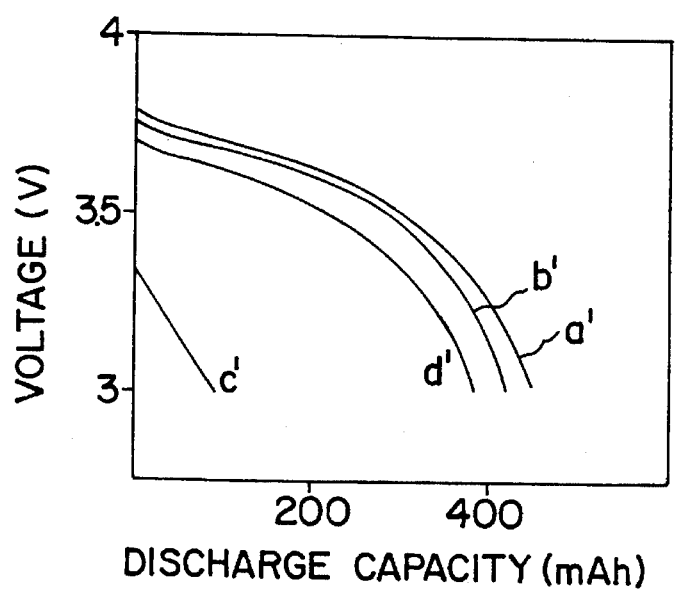
FIG. 12 is a graph which shows a change of the discharge voltage at −10° C. of the batteries of Example 7.
Figure 13:
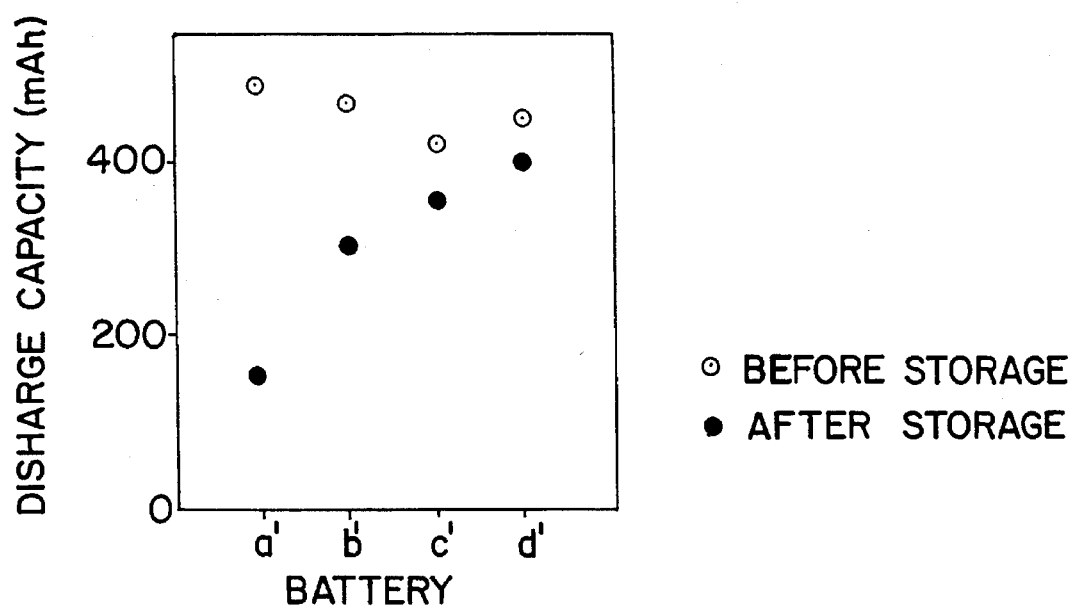
FIG. 13 is a graph which shows the discharge capacity of the batteries before and after being stored in Example 7.

The low-temperature discharge characteristics of batteries a'–d' are shown in FIG. 12 and the shelf life characteristics are shown in FIG. 13.

As shown in FIG. 12, the low-temperature characteristics of these batteries a'–d' were lower in the order a'-b'-d'-C', with a' being the best. In the case of the two-component solvents, with decrease of the carbon number contained in R of the aliphatic carboxylate of RCOOR' mixed with PC, the low-temperature characteristic was superior. This is because the solvent less in carbon number is lower in viscosity and increases electrical conductivity at low temperatures. Furthermore, for the aliphatic carboxylate and the chain carbonate, the former gave superior low-temperature characteristic. This is also because the aliphatic carboxylate increases electrical conductivity at lower temperatures than the chain carbonate. The ranking of the three-component solvent comprising PC, EP and EMC in battery d' was between the two-component solvent comprising PC and EP and the two-component solvent comprising PC and EMC and was closer to the two-component solvent comprising PC and EP in discharge capacity at low temperatures. The low-temperature characteristic was improved by the addition of EP, but the effect did not increase so much when the amount of EP added was more than a certain level.

Next, as shown in FIG. 13, the shelf lives of batteries a'–d' were lower in the order c'-d'-b'-a', with c' being the best. Battery a' was especially inferior, and the capacity thereof after being stored at high temperatures decreased to less than 50% of the capacity before being stored. On the other hand, batteries b', c' and d' maintained capacities of more than 85% even after being stored. From these results, it can be seen that superior shelf life characteristic at high temperatures can be obtained when a mixture of PC and ethyl propionate which is an aliphatic carboxylate of RCOOR' where the carbon number of R is 2 is used as a solvent for the electrolyte. Battery C' where the chain carbonate was used was further higher in capacity after being stored as compared with the battery where the aliphatic carboxylate was used and thus, good shelf life characteristic at high temperatures was obtained. The ranking of the three-component solvent comprising PC, EP and EMC in battery d' was between the two-component solvent comprising PC and EP and the two-component solvent comprising PC and EMC and was closer to the two-component solvent comprising PC and EMC in retention of capacity after being stored. The characteristic was not improved simply because the amount of EP was reduced, but addition of EMC inhibited the reaction between EP and lithium in the carbon of the anode.

From the results of Examples 6 and 7, good results were obtained in all of the cycle life characteristic, low-temperature discharge characteristic and high-temperature shelf life characteristic when a mixed solvent comprising PC, an aliphatic carboxylate and chain carbonate where the carbon number of R in the aliphatic carboxylate is 2 was used as the solvent for the electrolyte.

EXAMPLE 8

The same cylindrical batteries as mentioned above were made using the solvents comprising PC, EMC and EP which showed good characteristics in Examples 6 and 7 and which were mixed at the following eight volume ratios. Lithium hexafluorophosphate was used as a solute of electrolyte as in Examples 6 and 7 with a concentration adjusted to 1 mol/l.

Battery e . . . PC:EP:EMC=1:4.5:4.5
Battery f . . . PC:EP:EMC=2:4.0:4.0
Battery g . . . PC:EP:EMC=3:3.5:3.5
Battery h . . . PC:EP:EMC=4:3.0:3.0
Battery i . . . PC:EP:EMC=5:2.5:2.5
Battery j . . . PC:EP:EMC=6:2.0:2.0
Battery k . . . PC:EP:EMC=7:1.5:1.5
Battery l . . . PC:EP:EMC=8:1.0:1.0

The constituting conditions other than the electrolytes mentioned above were the same as in Examples 6 and 7.

The evaluated battery characteristics were a cycle life characteristic and low-temperature characteristic. First, ten cycles of the charge-discharge of the batteries were repeated at 20° C. under the same conditions as in Examples 6 and 7 and then, the test was stopped in a charged state. Thereafter, discharge was carried out under the same conditions except for the temperature which was changed to −10° C., and the low-temperature characteristic was evaluated by the discharge capacity obtained. Then, the temperature was returned to 20° C., and the charging and discharging were repeated under the same conditions. The test was terminated when the discharge capacity deteriorated to less than 250 mAh and the number of cycles at that time were compared.

Figure 14:
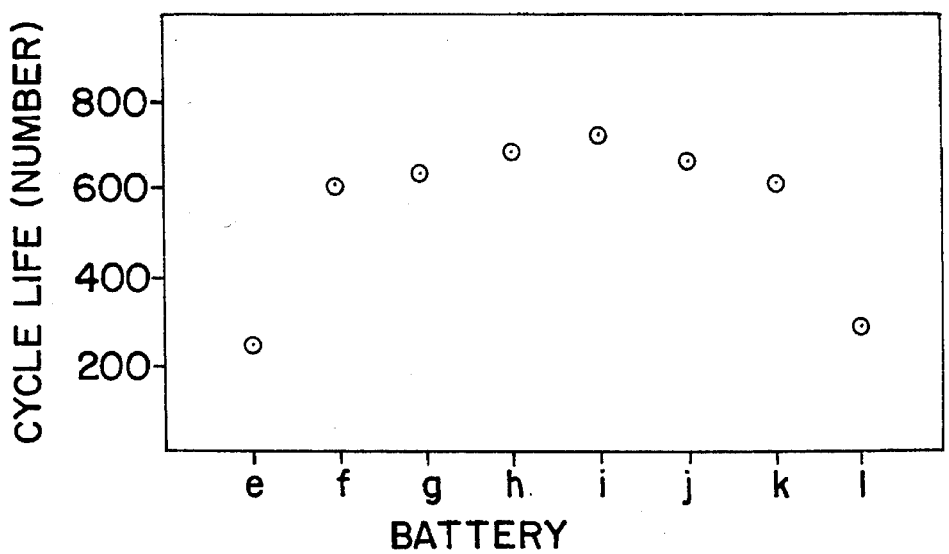
FIG. 14 is a graph which shows the cycle life at 20° C. of the batteries in Example 8.
Figure 15:
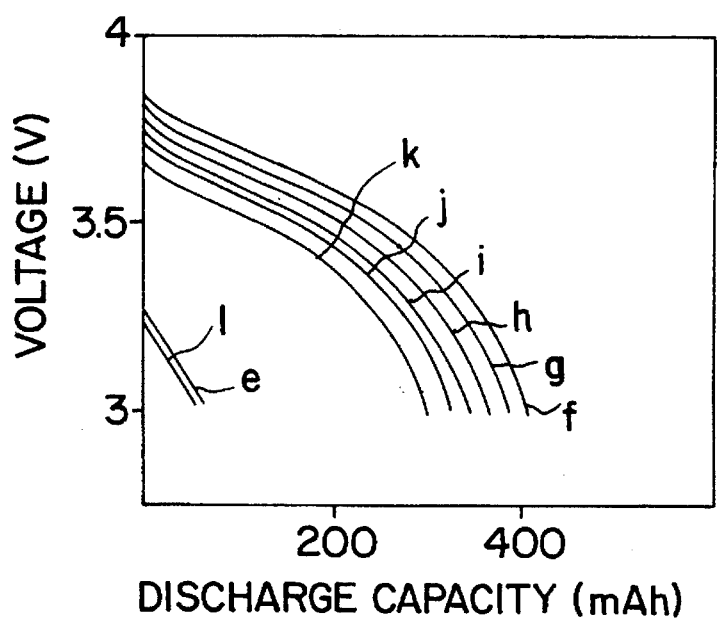
FIG. 15 is a graph which shows a change of the discharge voltage at −10° C. of the batteries of Example 8.

The cycle life characteristic and the low-temperature discharge characteristic of batteries e–l are shown in FIG. 14 and FIG. 15, respectively.

As shown in FIG. 14, the cycle lives of batteries e–l were lowered in the order of i-h-j-g-k-f-l-e, with i being the best. It is considered that the mixing ratio of PC is suitably 20–70% and when it is less than this range, the electrical conductivity decreases and so the cycle life is adversely affected, and when it is more than this range, the degree of decomposition of PC increases and so the cycle life deteriorates greatly.

As shown in FIG. 15, the low-temperature characteristics of the batteries e–l were lower in the order f-g-h-i-j-k-e-l with f being the best, and batteries e and l were especially inferior. The reason for l being inferior is considered to be that since the mixing ratio of PC was high, the electrolyte increased in viscosity at low temperatures and polarization of the battery increased and, as a result, the discharge capacity decreased. On the other hand, it is considered that in battery e, since the mixing ratio of PC having high dielectric constant was low, it has no ability to dissolve a given amount of solute at low temperatures to cause precipitation of the solute and liquid resistance increased to bring about an increase of polarization.

From the above results, it can be seen that the most suitable mixing ratio of PC in the three-component solvent of aliphatic carboxylate, cyclic carbonate and chain carbonate is 20–70% based on the total solvent components.

EXAMPLE 9

The same cylindrical batteries as mentioned above were made using as solvents for electrolytes the following six mixed solvents prepared by combination of the three components PC, EMC and EP as in Example 8. Lithium hexafluorophosphate was used as a solute of electrolyte as in Examples 6–8 with a concentration adjusted to 1 mol/l.

Battery m . . . PC:EP:EMC=5:0.5:4.5
Battery n . . . PC:EP:EMC=5:1.0:4.0
Battery o . . . PC:EP:EMC=5:2.0:3.0
Battery p . . . PC:EP:EMC=5:3.0:2.0
Battery q . . . PC:EP:EMC=5:4.0:1.0
Battery r . . . PC:EP:EMC=5:4.5:0.5

The constituting conditions and test conditions other than those of the electrolytes mentioned above were the same as in Examples 6–8.

Figure 16:
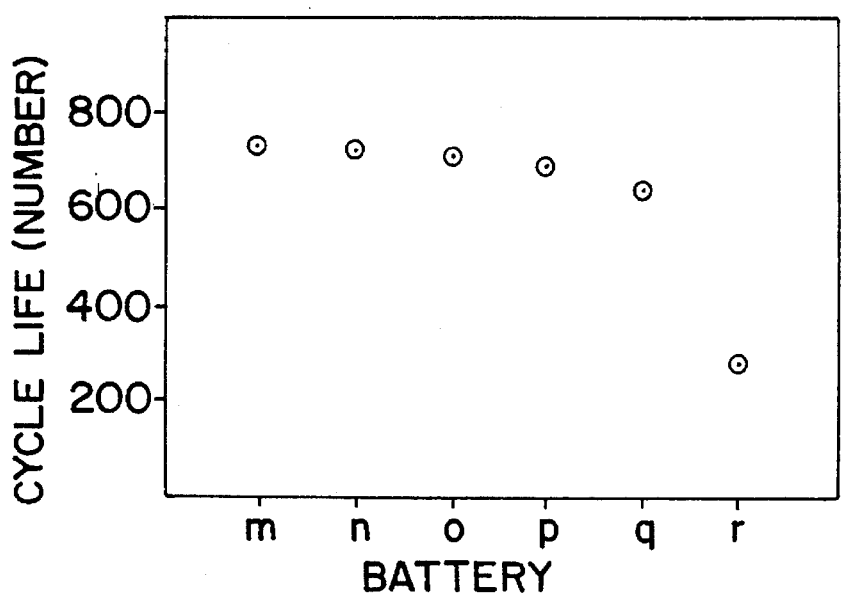
FIG. 16 is a graph which shows the cycle life at 20° C. of the batteries in Example 9.
Figure 17:
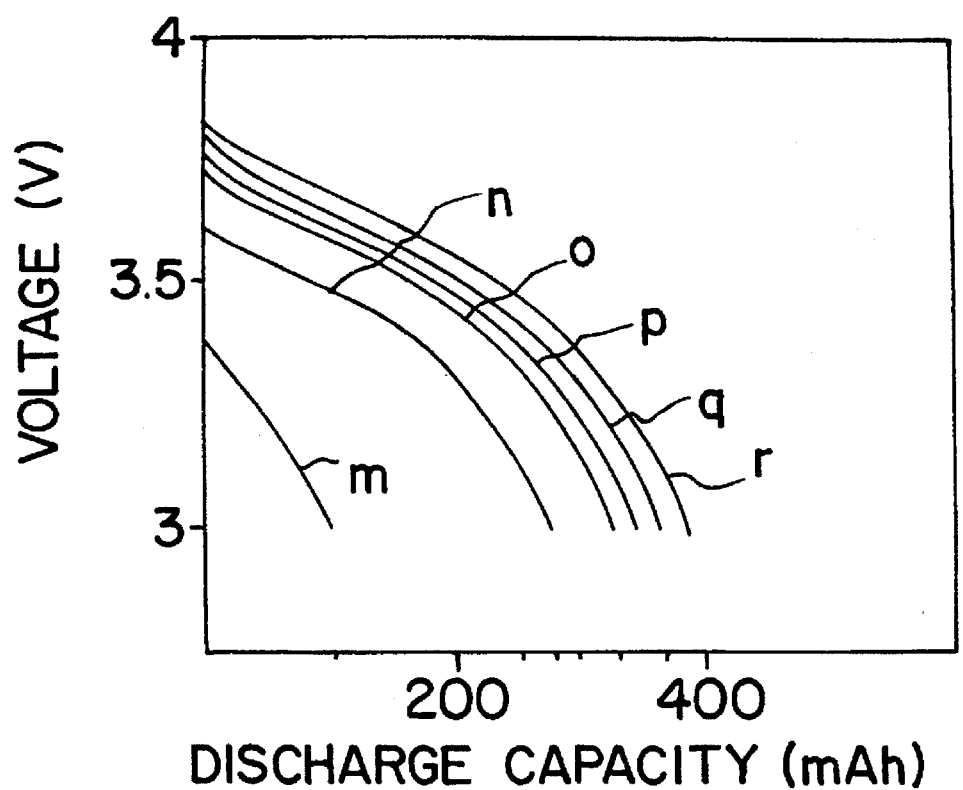
FIG. 17 is a graph which shows a change of the discharge voltage at −10° C. of the batteries in Example 9.

The cycle life characteristic and the low-temperature discharge characteristic of batteries m–r are shown in FIG. 16 and FIG. 17, respectively.

As shown in FIG. 16, the cycle lives of batteries m–r were lower in the order m-n-o-p-q-r with m being the best, and the cycle life was longer with a decrease in the mixing ratio of EP and increase in the mixing ratio of EMC. It is considered that this is because EMC is more stable against lithium than EP.

The battery r was especially inferior. The effect to inhibit the deterioration of cycle life by the addition of EMC appeared at the addition of 10% or more of EMC, and the effect was insufficient when the added amount was less than 5%.

On the other hand, as shown in FIG. 17, the low-temperature characteristics of the batteries were lowered in the order of r-q-p-o-n-m with r being the best, and the battery m was especially inferior. It is considered that this is because the mixing ratio of EP which was a low-viscosity solvent was merely 5% and hence, the electrical conductivity at low temperatures was low, and the capacity was insufficient. On the other hand, the effect of the addition of EP was seen in batteries n–r, and these batteries showed sufficient discharge capacity.

From the above results, it was found that the lower limit of the optimum mixing ratio of EP was 10% and when the mixing ratio was less than 10%, the effect of the addition of EP at low temperatures was not obtained. The lower limit of the mixing ratio of EMC was also 10% and when it was less than 10%, the effect of inhibiting the deterioration of cycle life was not obtained. The upper limit calculated from the lower limits of PC and EP was 70%.

Considering the results of Examples 1–9 together, it can be seen that three-component mixed solvents of aliphatic carboxylates, cyclic carbonates and chain carbonates can be used for obtaining superior cycle life characteristic, low-temperature characteristic and high-temperature shelf life characteristic in lithium secondary batteries in which lithium composite oxides which show a high potential are used for a cathode, and carbon materials are used for an anode. Furthermore, it has also been found that superior characteristics are obtained when the proportion, by volume, of the aliphatic carboxylate in the total solvent components is 10–70%, that of the cyclic carbonate is 20–70% and that of the chain carbonate is 10–70%.

It has also been found that the superior characteristics can be obtained when the highly graphitized carbon is used as the anode active material, ethylene carbonate as the cyclic carbonate, and the proportions of solvents are, by volume of the total volume of the solvents, 10–40% of an aliphatic carboxylate, 20–30% of the ethylene carbonate, and 30–70% of a chain carbonate, and lithium hexafluorophosphate is used as the solute.

It has been further found that especially superior characteristics can be obtained when a mixed solvent comprising aliphatic carboxylate, ethylene carbonate and chain carbonate at a mixing ratio (by volume) of 2:3:5 or 1:3:6, in which the respective values include errors within ±30%, is used.

When amorphous carbon was used as the anode active material, propylene carbonate as the cyclic carbonate and the proportions of the solvents are, by volume of the total volume of the solvents, 10–40% of an aliphatic carboxylate, 30–50% of a propylene carbonate and 30–70% of a chain carbonate, and lithium hexafluorophosphate as a solute for the electrolyte, it was found that excellent properties were obtained.

Furthermore, when the aliphatic carboxylate, propylene carbonate and chain carbonate were mixed in ratios of 2:5:3 and 3:5:2, respectively, including an error of ±30%, it was found that especially excellent properties were obtained.

In the above Examples, a lithium and cobalt composite oxide was used as active materials for the cathode, but similar results were obtained using other lithium-containing oxides such as, for example, a lithium and manganese composite oxide, which are referred to hereinbefore. Moreover, the similar results were obtained by using these composite oxides in which Co or Mn is partially replaced with other transition metals.

Especially in Examples 3–5 and 7–9, lithium hexafluorophosphate was used as a solute in the electrolyte, and ethylene carbonate and propylene carbonate were used as the cyclic carbonate, methyl propionate and ethyl propionate were used as the aliphatic carboxylate and diethyl carbonate and ethyl methyl carbonate were used as the chain carbonate for the solvent components of the electrolyte. However, similar results were obtained when other solutes such as lithium borofluoride, lithium perchlorate and lithium trifluoromethanesulfonate were used, or propyl propionate was used as the aliphatic carboxylate and dimethyl carbonate was used as the chain carbonate. Furthermore, the effects depending on the mixing ratio of the solvent components were also the same as in the above Examples, provided that there were two cases where ethylene carbonate was used and propylene carbonate was used as the cyclic carbonate.

As is clear from the above explanation, the present invention can provide nonaqueous electrolyte secondary batteries excellent in cycle life characteristic and low-temperature characteristic by using three-component mixed solvents comprising an aliphatic carboxylate, a cyclic carbonate and a chain carbonate as solvents for electrolytes.

What is claimed:

1. A nonaqueous electrolyte secondary battery which is provided with an anode comprising a carbon material capable of doping and undoping lithium ions, a nonaqueous electrolyte comprising a solute and a solvent, and a cathode comprising a lithium-containing oxide, said solvent being a mixed solvent comprising an aliphatic carboxylate represented by the formula RCOOR' wherein R represents an ethyl group and R' represents an alkyl group of 1–3 carbon atoms, a cyclic carbonate and a chain carbonate, said cyclic carbonate being one of ethylene carbonate and propylene carbonate.

2. A nonaqueous electrolyte secondary battery according to claim 1, wherein said aliphatic carboxylate is selected from the group consisting of methyl propionate, ethyl propionate and propyl propionate.

3. A nonaqueous electrolyte secondary battery according to claim 1, wherein said chain carbonate is at least one selected from the group consisting of diethyl carbonate, dimethyl carbonate and ethyl methyl carbonate.

4. A nonaqueous electrolyte secondary battery according to claim 1, wherein the proportion of the aliphatic carboxylate is 10–70% by volume, that of the cyclic carbonate is 20–70% by volume and that of the chain carbonate is 10–70% by volume based on the total solvent.

5. A nonaqueous electrolyte secondary battery according to claim 1, wherein said nonaqueous electrolyte contains at least one compound selected from the group consisting of lithium hexafluorophosphate, lithium borofluoride, lithium perchlorate and lithium trifluoromethanesulfonate as the solute.

6. A nonaqueous electrolyte secondary battery according to claim 1, wherein said cathode comprises an active material selected from the group consisting of a lithium and cobalt composite oxide, a lithium and manganese composite oxide, and the composite oxide in which cobalt or manganese is partially replaced with at least one other transition metal.

7. A nonaqueous electrolyte secondary battery according to claim 1, wherein said cathode comprises a lithium and cobalt composite oxide, said solvent is a mixture of methyl propionate, ethylene carbonate and diethyl carbonate, and said solute is lithium hexafluorophosphate.

8. A nonaqueous electrolyte secondary battery according to claim 1, wherein said cathode comprises a lithium and cobalt composite oxide, and the proportion of aliphatic propionate is 10–40% by volume, that of cyclic carbonate is 20–30% by volume and that of chain carbonate is 30–70% by volume based on the total solvent.

9. A nonaqueous electrolyte secondary battery according to claim 1, wherein said cathode comprises a lithium and cobalt composite oxide, and said solvent is a mixture of methyl propionate, ethylene carbonate and diethyl carbonate at a mixing volume ratio of 2:3:5 in which the respective values include errors within ±30%, and said solute is lithium hexafluorophosphate.

10. A nonaqueous electrolyte secondary battery according to claim 1, wherein said cathode comprises a lithium and cobalt composite oxide, and said solvent is a mixture of methyl propionate, ethylene carbonate and diethyl carbonate at a mixing volume ratio of 1:3:6 in which the respective values include errors within ±30%, and said solute is lithium hexafluorophosphate.

11. A nonaqueous electrolyte secondary battery according to claim 1, wherein the carbon material for the anode is one selected from the group consisting of petroleum coke and carbon fibers having been heat-treated, respectively, at a temperature of 2000° C. or higher, artificial graphite and natural graphite, or mixtures of two or more thereof, and said cyclic carbonate is ethylene carbonate.

12. A nonaqueous electrolyte secondary battery according to claim 11, wherein the lattice spacing (d002) of the anode carbon material as measured by an X-ray diffraction method is 3.39 Å or less.

13. A nonaqueous electrolyte secondary battery according to claim 11, wherein the lattice spacing (d002) of the anode carbon material as measured by an X-ray diffraction method is not less than 3.36 Å but not more than 3.39 Å.

14. A nonaqueous electrolyte secondary battery according to claim 12, wherein the lattice spacing (d002) of the anode carbon material as measured by an X-ray diffraction method is not less than 3.36 Å but not more than 3.39 Å.

15. A nonaqueous electrolyte secondary battery according to claim 13, wherein the anode carbon material is mesocarbon beads from mesophase microspheres produced in a pitch-carbonizing process and graphitized by heat treating at a temperature of 2000° C. or higher, and has a lattice spacing (d002) of nor less than 3.36 Å but not more than 3.38 Å as measured by a wide angle X-ray diffraction method.

16. A nonaqueous electrolyte secondary battery according to claim 14, wherein the anode carbon material is mesocarbon beads from mesophase microspheres produced in a pitch-carbonizing process and graphitized by heat treating at a temperature of 2000° C. or higher, and has a lattice spacing (d002) of nor less than 3.36 Å but not more than 3.38 Å as measured by a wide angle X-ray diffraction method.

17. A nonaqueous electrolyte secondary battery according to claim 1, wherein the lattice spacing (d002) of the anode carbon material as measured by an X-ray diffraction method is 3.40 Å or more, and the cyclic carbonate as the solvent of the electrolyte is propylene carbonate.

18. A nonaqueous electrolyte secondary battery according to claim 1, wherein the lattice spacing (d002) of the anode carbon material as measured by an X-ray diffraction method is 3.43 Å or more, and the cyclic carbonate as the solvent of the electrolyte is propylene carbonate.

19. A nonaqueous electrolyte secondary battery which is provided with an anode comprising a carbon material capable of doping and undoping lithium ions, a nonaqueous electrolyte comprising a solute and a solvent, and a cathode comprising a lithium-containing oxide, said solvent being a mixed solvent comprising an aliphatic carboxylate represented by the formula RCOOR' wherein R represents an ethyl group and R' represents an alkyl group of 1–3 carbon atoms, a cyclic carbonate and a chain carbonate, said chain carbonate being selected from the group consisting of diethyl carbonate, dimethyl carbonate and ethyl methyl carbonate.

* * * * *